United States Patent
Yoon et al.

(10) Patent No.: US 10,245,664 B2
(45) Date of Patent: Apr. 2, 2019

(54) BEVEL GEAR CUTTING MACHINE FOR CHAMFERING BEVEL GEAR TOOTH EDGES AND METHOD FOR CHAMFERING THE TOOTH EDGES OF BEVEL GEARS

(71) Applicant: Klingelnberg AG, Zürich (CH)

(72) Inventors: Ji Kyung Yoon, Hückeswagen (DE);
Jürgen Weber, Hückeswagen (DE);
Karl-Martin Ribbeck, Remscheid (DE)

(73) Assignee: KLINGELNBERG AG (CH)

( * ) Notice: Subject to any disclaimer, the term of this patent is extended or adjusted under 35 U.S.C. 154(b) by 11 days.

(21) Appl. No.: 15/708,576

(22) Filed: Sep. 19, 2017

(65) Prior Publication Data
US 2018/0085839 A1    Mar. 29, 2018

(30) Foreign Application Priority Data

Sep. 23, 2016 (DE) .................... 10 2016 117 962

(51) Int. Cl.
*B23F 19/10* (2006.01)
*B23F 23/12* (2006.01)

(52) U.S. Cl.
CPC ........... *B23F 19/102* (2013.01); *B23F 23/12* (2013.01); *B23F 19/105* (2013.01); *Y10T 409/101272* (2015.01)

(58) Field of Classification Search
CPC . Y10T 409/101113; Y10T 409/101272; B23F 19/10; B23F 19/102; B23F 19/105; B23F 19/107; B23F 19/104
See application file for complete search history.

(56) References Cited

U.S. PATENT DOCUMENTS

| | | | | |
|---|---|---|---|---|
| 1,680,083 | A | * | 8/1928 | Blades ............... B23F 19/104 409/8 |
| 2,078,124 | A | * | 4/1937 | Condon ............... B23F 19/101 409/9 |

(Continued)

FOREIGN PATENT DOCUMENTS

| DE | 10230148 A1 | 1/2004 |
|---|---|---|
| DE | 202004004480 U1 | 6/2004 |

(Continued)

OTHER PUBLICATIONS

European Search Report Issued for EP 17191349, dated Feb. 7, 2018, 7 pages.

(Continued)

*Primary Examiner* — Daniel Howell
*Assistant Examiner* — Yasir Diab
(74) *Attorney, Agent, or Firm* — McCarter & English, LLP (57) ABSTRACT

Bevel gear cutting machines having multiple numerically-controllable axes, a workpiece spindle, which accommodates a bevel gear coaxially in relation to a workpiece spindle axis, and a deburring device having a deburring spindle for accommodating at least one first deburring tool. The bevel gear cutting machines may chamfer tooth edges of the bevel gear in two passes, where, in a first pass, first chamfers are provided on the tooth edges by using the first deburring tool, and, in a second pass, second chamfers are provided in the region of the first chamfers by using the first deburring tool or by using a second deburring tool in a continuous procedure, in which the bevel gear and the first or second deburring tool rotate in a coupled manner while engaged with one another.

17 Claims, 6 Drawing Sheets

(56) References Cited

U.S. PATENT DOCUMENTS

| | | | | |
|---|---|---|---|---|
| 2,135,819 A | * | 11/1938 | Klix | B23F 21/00 407/20 |
| 2,668,480 A | * | 2/1954 | Christman | B23F 19/101 409/9 |
| 3,083,616 A | * | 4/1963 | Male | B23F 19/101 409/8 |
| 3,286,593 A | * | 11/1966 | Bibbens | B23F 19/101 409/61 |
| 3,426,485 A | * | 2/1969 | Yamaoka | B23F 19/12 409/9 |
| 3,797,361 A | * | 3/1974 | Redin | B23F 1/04 409/8 |
| 4,012,990 A | * | 3/1977 | Wagner | B23F 19/105 409/8 |
| 4,548,531 A | * | 10/1985 | Seitelman | B23F 19/10 409/9 |
| 2005/0207858 A1 | * | 9/2005 | Muller | B23F 9/10 409/8 |
| 2005/0260050 A1 | * | 11/2005 | Ribbeck | B23C 5/22 409/39 |
| 2007/0186398 A1 | * | 8/2007 | Lee | B23F 19/10 29/56.5 |
| 2013/0022424 A1 | | 1/2013 | Hsiao et al. | |

FOREIGN PATENT DOCUMENTS

| | | |
|---|---|---|
| DE | 202004008263 U1 | 8/2004 |
| DE | 102013212432 A1 | 12/2014 |
| DE | 102014018328 A1 | 6/2016 |
| EP | 1598137 B1 | 11/2005 |
| JP | S6451223 A | 2/1989 |

OTHER PUBLICATIONS

German Search Report Issued for DE 10 2016 117 962.0, dated Sep. 15, 2017, 9 pages.

* cited by examiner

BEVEL GEAR CUTTING MACHINE FOR CHAMFERING BEVEL GEAR TOOTH EDGES AND METHOD FOR CHAMFERING THE TOOTH EDGES OF BEVEL GEARS

CROSS REFERENCE TO RELATED APPLICATIONS

This application claims priority under 35 U.S.C. §§ 119 (a)-(d) to German patent application no. DE102016117962.0 filed Sep. 23, 2016, which is hereby expressly incorporated by reference as part of the present disclosure.

FIELD OF INVENTION

The present invention relates to bevel gear cutting machines and the chamfering on the tooth edges of bevel gears in the continuous method. The invention also relates to a method for chamfering the tooth edges of bevel gears.

BACKGROUND

In the manufacturing of bevel gears, a burr (also referred to as a primary burr here) can arise, for example, at the outer tooth end due to cutting machining. Because of the high risk of injury, but also because of the risk of complete hardening when hardening the bevel gears, these tooth edges are frequently broken by a chamfer in the scope of chamfering.

Figure 1A:
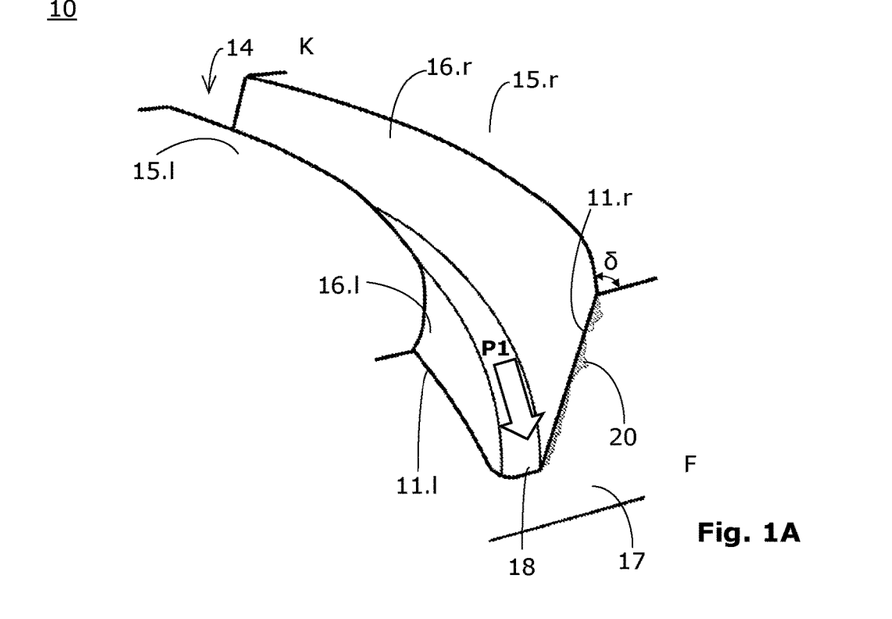
FIG. 1A shows a schematic perspective view of a bevel gear, wherein a single tooth gap after gear cutting is indicated, at the profile edge of which primary burrs have formed.

In the described chamfering, depending on the constellation, a secondary burr can result on the bevel gear upon removal of the primary burr. If the primary deburring is performed using a deburring tool, the cutting edge(s) of which are guided outward coming from a tooth gap, the secondary burr thus results on the outer circumference of the bevel gear, as shown in FIG. 1A. In contrast, if the deburring tool is guided from the base to the head of the bevel gear 10 (into a tooth gap) during the primary deburring, the secondary burr thus results in the functional region of the bevel gear 10. In mass production, the primary deburring is therefore carried out in most cases from the inside to the outside, as symbolized in FIG. 1A by the block arrow P1.

A corresponding example is shown in FIG. 1A. A primary burr primarily occurs at the tooth edge 11.r of the concave flank, since this flank generally forms a relatively acute angle δ with the rear face 17 of the bevel gear tooth 10. If only the primary burr 20 were removed at this tooth edge 11.r (for example, by using a brush), a very sharp tooth edge 11.r would remain standing. Therefore, a chamfer is usually created at least in the region of the tooth edge 11.r by chamfering.

Figure 1B:
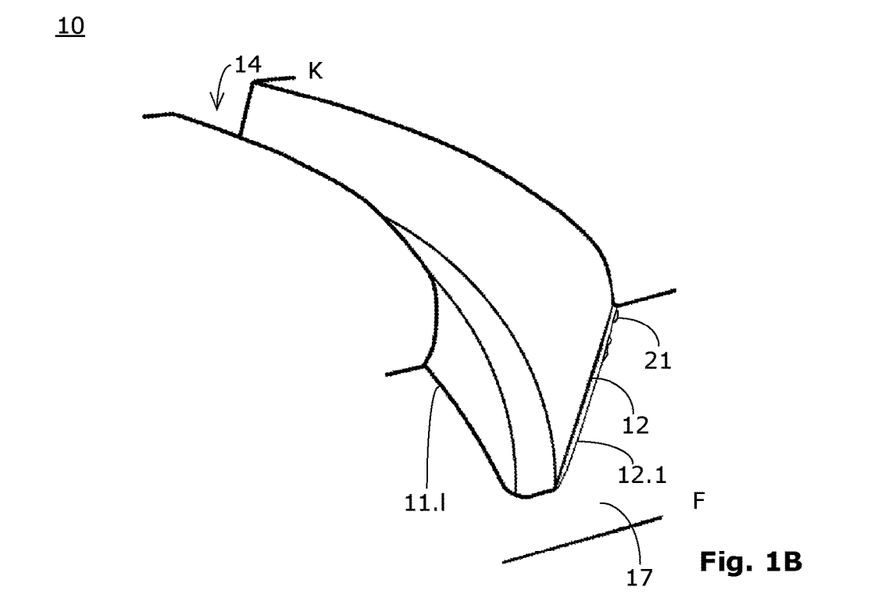
FIG. 1B shows a schematic perspective view of the bevel gear of FIG. 1A, after a first chamfer was created at the profile edge, wherein secondary burrs have formed at the newly resulting chamfer edge in the upper region.

The situation after the chamfering of the tooth edge 11.r is shown in FIG. 1B on the basis of the bevel gear 10 of FIG. 1A. The profile of the first chamfer 12 can be schematically seen in FIG. 1B. As can be seen in FIG. 1B, a secondary burr 21 can form along the first chamfer 12.

However, a secondary burr does not always occur. Relationships have been shown here, for example, with respect to the quality of the cutting edges of the deburring tool. As long as the deburring tool has sharp cutting edges, the primary deburring runs relatively reliably. As cutting edges become blunter, the material of the bevel gear is no longer cut, but rather displaced. In this case, the tendency toward forming a secondary burr increases. Since the tooth edge typically does not have a linear profile between bevel gear teeth and, for example, the base of the bevel gear, the thickness of the chips to be removed during the chamfering varies. Also for this reason, secondary burrs can sometimes result.

Such a secondary burr 21 does not always occur and can also only form, for example, in a partial region of the first chamfer 12, as indicated in FIG. 1B.

Such a secondary burr 21 is accompanied by multiple disadvantages. On the one hand, a risk of injury during manual handling of such a bevel gear 10 exists because of the secondary burr 21. On the other hand, the secondary burr 21 can result in undesired soiling of the hardening device in which the bevel gear 10 is hardened. This is a disadvantage above all if the hardening is carried out in a closed hardening device, the interior of which is to be kept free of soiling as much as possible. If the tooth flanks are to be ground in the scope of fine machining, a secondary burr which was not removed can thus destroy the grinding tool. In addition, residues of a secondary burr can detach during installation in a transmission and result in problems therein.

Secondary burrs can be removed, for example, by the use of nylon or brass brushes, these tools are subject to wear, however. They therefore have to be replaced from time to time. To avoid the occurrence of secondary burr, the cutting edges of the deburring tools could also be reground more often, which is linked to a time and cost expenditure, however, especially because one has to intervene early enough, before secondary burr can begin to form at all.

SUMMARY

The need therefore exists for chamfering bevel gears so that burrs are removed reliably and safely. Especially in the mass production of bevel gears—for example, in automobile construction—the problems which result in conjunction with secondary burr have to be avoided.

An object of the invention is therefore bevel gear cutting machine wherein secondary burrs can be reliably removed with little expenditure on various types of bevel gears.

The objects are achieved according to some embodiments by one or more gear cutting machines disclosed herein. Further advantageous embodiments are also disclosed herein.

This object is achieved according to some embodiments by a bevel gear cutting machine equipped with a first deburring tool, to be able to chamfer the tooth edges on the teeth of a bevel gear in a first pass, wherein during this first pass, a primary burr on the tooth edges is removed by the creation of a first chamfer. The first deburring tool or a second deburring tool is then used in this bevel gear cutting machine, in a second pass, to chamfer edges which have arisen during the first pass in the region of the first chamfers. In this second pass, secondary burrs possibly existing on these edges are removed, by providing second chamfers which are narrower than the chamfers of the first pass.

The tooth edges are also referred to here as profile edges. The edges at which secondary burrs can be present are also referred to here as chamfer edges, to be able to differentiate them in speech from the tooth edges.

Machining methods can be carried out in at least some embodiments using the same deburring tool, i.e., in this case the first deburring tool corresponds to the second deburring tool. However, the first and the second deburring tool can also differ.

A deburring cutterhead may be used in at least some embodiments as the deburring tool. "Deburring tool" is used as the more general term hereafter, wherein in each case the word deburring tool may optionally be replaced by the word deburring cutterhead, if not explicitly indicated otherwise.

In at least some embodiments, the deburring tool may be set more steeply (i.e., a steeper angle) before carrying out the second pass than in the first pass.

According to at least some embodiments, double facets may be created in two continuously running passes in the region of the tooth edges.

In at least some embodiments, a deburring device is used which comprises a first deburring tool for the first pass and a second deburring tool for the second pass.

In at least some embodiments, the first deburring tool and the second deburring tool are seated coaxially on a common deburring axis.

In at least some embodiments, deburring cutterheads are used which are equipped with cutter inserts (for example, in the form of rod cutters) made of hard metal. The use of hard metal cutter inserts offers degrees of freedom in the design of the cutting edges of these cutter inserts.

The first pass and the second pass may be continuous methods, in which both the deburring tool rotates about a bearing spindle axis and the workpiece (the bevel gear) rotates about a workpiece spindle axis, wherein these two rotational movements occur in a coordinated manner. They are therefore coupled rotational movements. This coupling may be performed by the CNC controller of the bevel gear cutting machine.

It is one advantage of some embodiments that a corresponding bevel gear cutting machine is flexibly usable, and the removal of primary and secondary burrs is performed reliably and with uniform accuracy.

The use of a two-step method in a bevel gear cutting machine is present in certain embodiments.

Advantages of at least some embodiments are that by using the axes (NC axes) which are numerically controllable by means of a programmable CNC controller, nearly arbitrarily shaped profile edges of bevel gears are achievable using the cutting edges of the deburring tool. A double facet can therefore also be created in the case of a curved profile edge. The formation of tertiary burrs may be avoided during the chamfering in the second pass, since with corresponding steep inclination of the cutting edges of the deburring tool in relation to the bevel gear, large quantities of material do not have to be removed to create the narrow second chamfer along the full tooth height. In addition, the angle which forms between the second chamfer and the truncated cone lateral surface at the base side of the bevel gear is significantly less acute than the angle which originally existed between the profile edges and the truncated cone lateral surface.

It is also advantageous in at least some embodiments, that the chamfering or deburring is performed in a continuous process, which results in substantially shorter processing times than with discontinuous processes.

Some embodiments may be implemented in a 6-axis, CNC-controlled bevel gear cutting machine, which comprises a deburring device, to which at least one additional axis is allocated. At least one linear axis and a deburring spindle axis are associated with the deburring device in some embodiments.

The deburring device can also be associated with a linear axis, a pivot axis, and a deburring spindle axis in some embodiments.

Some embodiments include a bevel gear cutting machine having multiple numerically-controllable axes. The machine includes a workpiece spindle, which accommodates a bevel gear coaxially in relation to a workpiece spindle axis. The machine also includes a deburring device having a deburring spindle for accommodating at least one first deburring tool having at least one cutting edge. The bevel gear cutting machine chamfers tooth edges in two passes. In a first pass, first chamfers are provided on the tooth edges by using the at least one cutting edge of the first deburring tool in a continuous procedure in which the bevel gear and the first deburring tool rotate in a coupled manner while engaged with one another. In a second pass, second chamfers are provided in the region of the first chamfers by using the at least one cutting edge of the first deburring tool or by using at least one cutting edge of a second deburring tool in a continuous procedure, in which the bevel gear and the first or second deburring tool rotate in a coupled manner while engaged with one another.

In some embodiments, the first deburring tool or the second deburring tool is set more steeply (e.g., a steeper angle) relative to the bevel gear before the second pass than previously in the first pass. In some embodiments, the first deburring tool and/or the second deburring tool is a deburring cutterhead. In some embodiments, the deburring cutterhead comprises cutter inserts made at least in part of hard metal, tool steel, or cutting ceramic. In some embodiments, the deburring device includes both the first deburring tool and the second deburring tool. In some embodiments, the first deburring tool is arranged coaxially in relation to the second deburring tool and the deburring device is designed to be pivoted about a pivot axis of the bevel gear cutting machine. In some embodiments, the pivot axis is a vertical axis. In some embodiments, the bevel gear cutting machine has at least six axes and, in addition to the six axes, includes a deburring spindle axis as a rotational axis of the deburring spindle. In some embodiments, in addition to the deburring spindle axis, the bevel gear cutting machine includes a linear axis used to move the first deburring tool and/or the second deburring tool linearly.

In some embodiments, a method for chamfering tooth edges of a bevel gear in a numerically-controllable bevel gear cutting machine is performed. The machine uses a deburring tool in a first pass to create first chamfers in a region of tooth edges. The machine uses a deburring tool in a second pass to create second chamfers in a region of the first chamfers. The first chamfers together with the second chamfers form double facets, which extend substantially in parallel to one another. In some embodiments, the first pass and the second pass are continuous machining procedures, in which the bevel gear and the deburring tool rotate in a coupled manner while engaged with one another. In some embodiments, the deburring tool is set less steeply (e.g., a lower angle) in relation to the bevel gear in the first pass than in the second pass. In some embodiments, the deburring tool is a deburring cutterhead which is equipped with multiple rod-type cutter inserts. In some embodiments, in the first pass, cutting edges of the deburring tool are guided from a head of the bevel gear to a base of the bevel gear outward through tooth gaps of the bevel gear, to create the first chamfers in the region of the tooth edges. In some embodiments, in the second pass, cutting edges of the deburring tool are guided from the head of the bevel gear to the base of the bevel gear outward through tooth gaps of the bevel gear, to create the second chamfers in the region of the first chamfers. In some embodiments, a different deburring tool is used in the second pass than in the first pass. In some embodiments, the machine includes a deburring device having two deburring tools. The deburring device carries out a rotation or pivot movement before the second pass in order to use a different deburring tool in the second pass than in the first pass.

DETAILED DESCRIPTION OF EMBODIMENTS

Figure 1C:
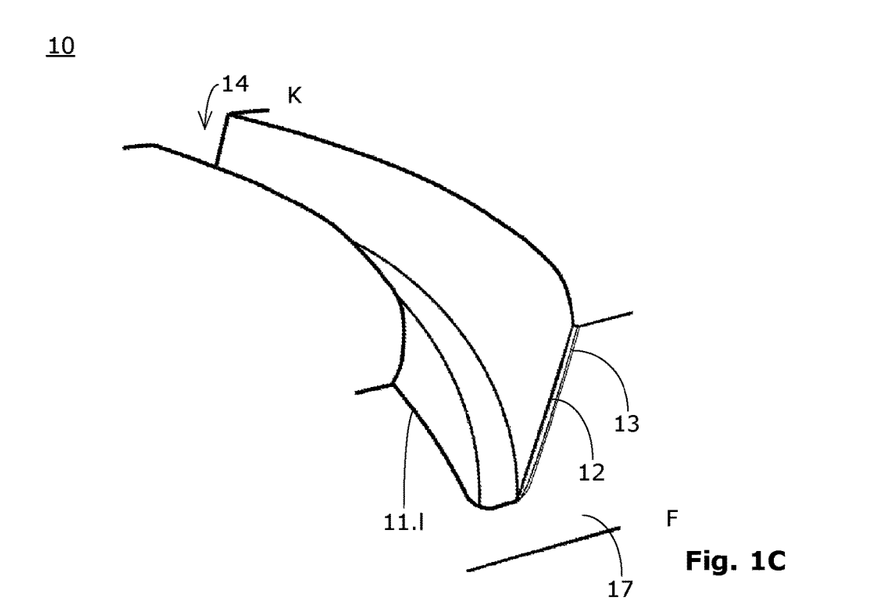
FIG. 1C shows a schematic perspective view of the bevel gear of FIG. 1A, after a second chamfer has been produced in the region of the first chamfer.

A schematic perspective view of a bevel gear 10 is shown in FIGS. 1A to 1C, wherein the machining steps will be explained on the basis of these three figures. Elements and terms which are used herein are also defined on the basis of FIGS. 1A to 1C.

In the mentioned figures, only a part of the main body of a bevel gear pinion 10 can be seen in schematic form. A single tooth gap 14 is indicated in the material of the main body. The example shown is a bevel gear 10 having a curved flank longitudinal line, as can be seen from the profile of the teeth 15.r and 15.l. However, embodiments of the invention may also be applied to other bevel gears 10. The bevel gear pinion 10 has a main body in the example shown, which is defined by two truncated cones having corresponding cone lateral surfaces. These cone lateral surfaces are, to be precise, truncated cone lateral surfaces. The two truncated cones are arranged coaxially in relation to the workpiece spindle axis B. The workpiece spindle axis B can be seen in FIGS. 3 and 4.

The teeth 15.r and 15.l of the bevel gear pinion 10 extend along the head truncated cone lateral surface. The truncated cone lateral surface identified in FIGS. 1A-1C by the reference sign 17 is referred to here in general as the (ring-shaped) heel-side lateral surface 17. In bevel gears, the term bevel gear head or simply head K and bevel gear base or base F are also used. The head K of the bevel gear 10 is located in FIGS. 1A-1C on the left side and the base F is located on the side of the truncated cone lateral surface 17.

In the transition region from the teeth 15.r and 15.l to the truncated cone lateral surface 17, during the cutting machining (referred to here as gear cutting or gear cutting machining), primary burrs 20 can arise (see FIG. 1A). In the transition region of the concave tooth flank 16.r to the truncated cone lateral surface 17, a right tooth edge 11.r (also called the right profile edge) results during the gear cutting and in the transition region of the convex tooth flank 16.l to the truncated cone lateral surface 17, a left tooth edge 11.l (also called the left profile edge) results during the gear cutting.

The primary burrs 20 form above all on the concave tooth flanks 16.r, respectively in the transition region of the concave tooth flanks 16.r to the truncated cone lateral surface 17. However, it is to be noted that primary burrs 20 can occur both on the tooth flanks and also on the tooth base 18.

A primary burr 20 usually arises in the mentioned region if milling is performed from the inside to the outside during the gear cutting, i.e., if a tool coming through the tooth gap 14 from the head K to the base F exits in the region of the truncated cone lateral surface 17 from this tooth gap 14. In FIG. 1A, a block arrow P1 is shown in the tooth gap 14, which indicates the cutting direction of a gear cutting tool upon exiting from this tooth gap 14.

Figure 3:
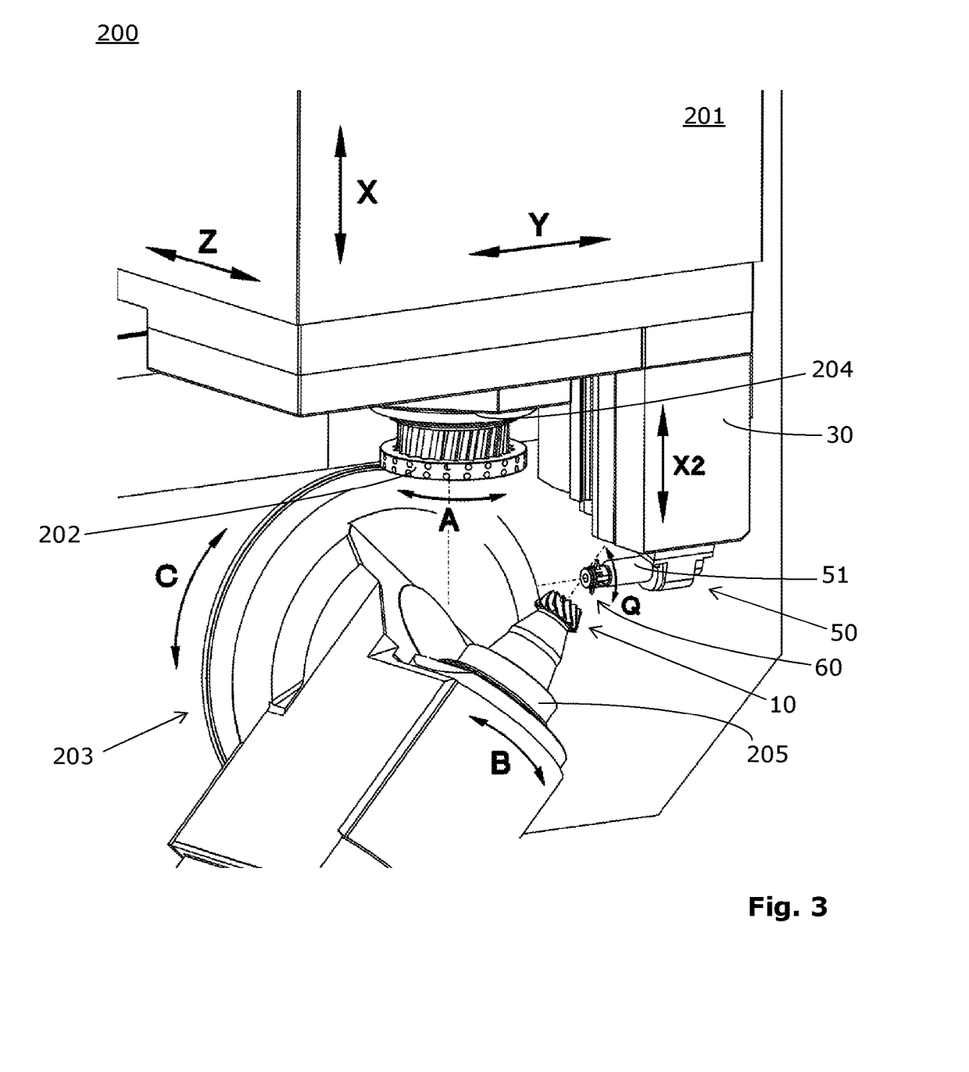
FIG. 3 shows a perspective partial view of a gear cutting machine, in which machining methods can be performed.
Figure 4:
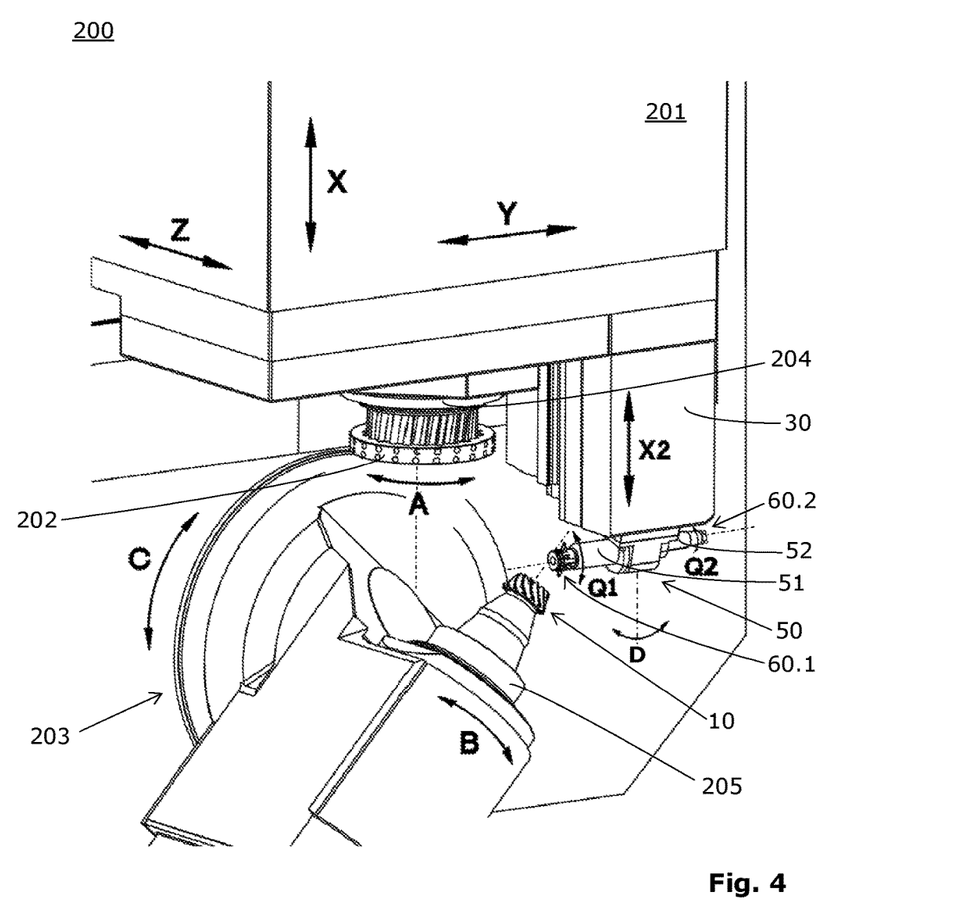
FIG. 4 shows a perspective partial view of a further gear cutting machine, in which machining methods can be performed carried out.

To now be able to remove the primary burr 20, the bevel gear 10 is chamfered in a bevel gear cutting machine 200 (see, for example, FIG. 3 or 4). The chamfering may comprise two passes, as follows:

During a first pass, first chamfers 12 are provided on the tooth edges 11.r and/or 11.l by the use of a first deburring tool 60 or 60.1 in a continuous procedure, as schematically shown by way of example in FIG. 1B. A continuous procedure in the meaning of this document is a procedure in which the bevel gear 10 and the first deburring tool 60, 60.1 rotate in a coupled manner while engaged with one another. The bevel gear 10 rotates in this case about the workpiece spindle axis B and the deburring tool 60 or 60.1 rotates about the deburring spindle axis Q.

During a second pass, second chamfers 13 are provided in the region of the first chamfers 12 by the use of the first deburring tool 60 or 60.1, or by the use of a second deburring tool 60.2 in a continuous procedure, as schematically shown by way of example in FIG. 1C.

In at least some embodiments, the first chamfer 12 forms a double facet together with the second chamfer 13, the individual chamfers 12 and 13 of which extend substantially parallel in relation to one another, as can be seen in FIG. 1C.

Figure 2:
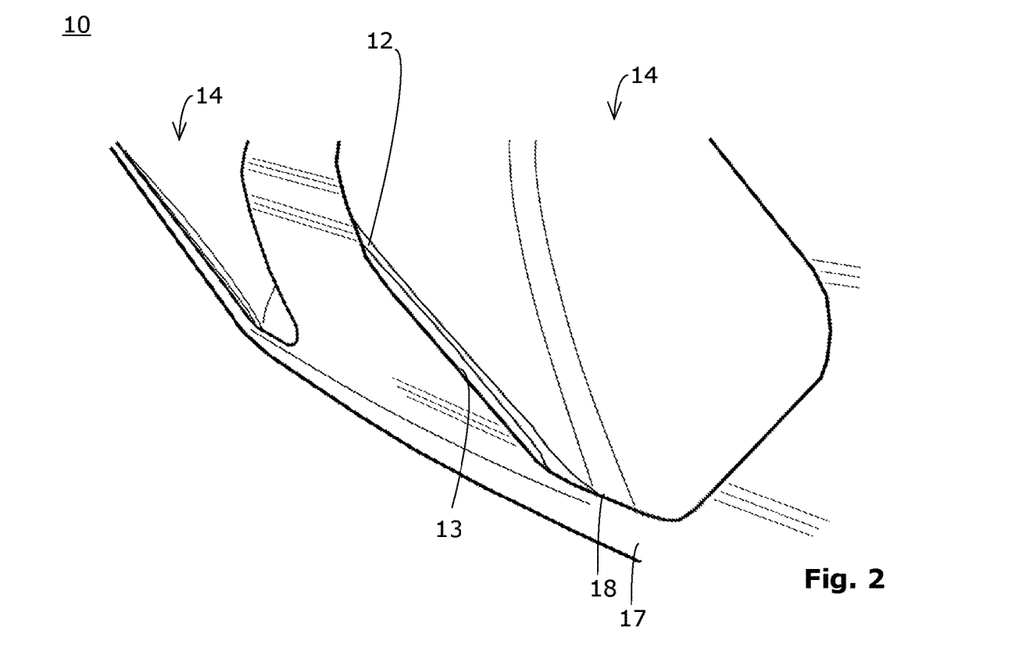
FIG. 2 shows a schematic perspective view of another bevel gear, which has a double facet.

Two adjacent tooth gaps 14 of a bevel gear 10 are shown in FIG. 2. The truncated cone lateral surface 17 of the bevel gear workpiece 10 was machined using a turning tool. The corresponding machining traces are indicated in FIG. 2 by shading, to thus be able to differentiate the material of the teeth better from the tooth gaps 14. It can be seen on the basis of the example shown in FIG. 2 of another bevel gear 10 that the individual chamfers 12 and 13 of the double facet can partially also have a slightly curved profile, which is finally a result of the flank shape and the curvature of the truncated cone lateral surface 17.

To be able to create a second chamfer 13 along the resulting chamfer edge 12.1 (see FIG. 1B) in the second pass, the deburring tool 60, 60.1, 60.2 is set more steeply in relation to the tooth edges of the bevel gear 10 to be deburred in the scope of the second pass than in the scope of the first pass. Details in this regard can be inferred from the schematic illustrations of FIGS. 6A and 6B.

FIG. 3 shows a perspective illustration of the basic structure of a first CNC gear cutting machine 200 configured for producing spiral-toothed bevel gears 10. Such a machine 200 may be designed or equipped to perform deburring or chamfering of the bevel gear 10 by means of a special deburring device 50. Machining methods disclosed herein may be applied to other CNC gear cutting machine(s) 200, however, and deburring devices other than the special deburring device 50 shown can be used.

The CNC gear cutting machine 200 can be constructed as follows. The machine 200 can comprise a machine housing 201, which enables a tool spindle 204 to be guided vertically and linearly along a coordinate axis X (first axis), horizontally and linearly along a coordinate axis Y (second axis), and horizontally and linearly along a coordinate axis C (third axis). The mentioned tool spindle 204 can be arranged hanging on the machine 200, wherein the corresponding tool spindle axis A (fourth axis) hangs vertically in space. The tool spindle 204 carries a tool, by way of example a cutterhead 202 having multiple rod cutters here.

A first pivot device 203 can be provided on the machine 200, which carries a workpiece spindle 205 having a workpiece spindle axis B (fifth axis). The workpiece spindle 205 including the workpiece spindle axis B can be pivoted about a pivot axis (C axis; sixth axis) of the first pivot device 203. The pivot axis C is perpendicular to the tool spindle axis A and extends horizontally in space here. If one looks from the front in the direction of the pivot axis C toward the machine 200 of FIG. 3, the workpiece spindle 205 is at a 14 o'clock (e.g., approximately 210° measured from the positive X axis) position in the moment shown. In this position, a deburring tool 60 can be moved into interaction with the bevel gear workpiece 10.

The workpiece spindle 205 carries a spiral-toothed bevel gear pinion as the workpiece 10 in the example shown. The first pivot device 203 is thus pivotable about the C axis so that the workpiece 10 is pivotable into a machining position below the gear cutting tool 202. Moreover, the workpiece 10 can be transferred by the first pivot device 203 into the position shown in FIG. 3 for deburring.

In addition, for example, a deburring device 50 having infeed device(s) is provided, to be able to move the deburring tool 60 relative to the bevel gear workpiece 10 and bring them into interaction with one another according to certain embodiments.

The deburring device 50 (which can comprise, for example, a deburring cutterhead 60.1 as a deburring tool 60) can comprise, for example, a linear axis X2 (seventh axis) and a deburring spindle axis Q (eighth axis), as shown in FIG. 3.

Using one or more of the mentioned axes, the deburring tool 60 can be moved relative to the bevel gear workpiece 10 into a starting position suitable for the deburring.

The workpiece 10 is then rotationally driven about the workpiece spindle axis B and the deburring tool 60 is rotationally driven about the deburring spindle axis Q in a coupled manner and they are moved relative to one another. In a continuous method, the cutting edges of the deburring tool 60 (for example, the cutting edges of the deburring cutters of the deburring cutterhead 60.1) execute corresponding chamfering movements on the predetermined edges 11.r and/or 11.l of the bevel gear 10. In the scope of this procedure, which is referred to as the first pass, the first chamfers 12 are created. The result of this first pass is shown by way of example in FIG. 1B, wherein only a first chamfer 12 was created on the right edge 11.r here.

In the scope of a second pass, which is carried out in at least some embodiments on the same machine 200, a second chamfer 13 is created in the region of the first chamfer 12. This is performed either using the same deburring tool 60 (for example, the deburring cutterhead 60.1) or using another (second) deburring cutterhead 60.2. The result of this second pass is shown by way of example in FIG. 1C, wherein a second chamfer 13 was also only created in the region of the previous right edge 11.r here.

As already mentioned, a different deburring tool 60 can be used during the second pass than during the first pass. During the first pass, for example, a deburring tool 60.1 can be used and during the second pass, for example, a deburring tool 60.2 can be used.

To be able to implement the chamfering/deburring in the continuous method, bevel gear cutting machines 200 having at least six numerically controlled axes, as shown in FIGS. 3 and 4, are used in some embodiments.

However, other CNC bevel gear cutting machines 200 can also be refitted or equipped, wherein machines having seven or eight numerically controlled axes are used in some embodiments, as already explained on the basis of FIG. 3.

A further bevel gear cutting machine 200 is described hereafter with reference to FIG. 4. The bevel gear cutting machine 200 of FIG. 4 is constructed similarly to the machine 200 of FIG. 3. The machine 200 has a workpiece spindle 205, which accommodates the bevel gear 10 to be machined coaxially in relation to the workpiece spindle axis B. The workpiece spindle 205 is seated on a pivot device 203, which is mounted so it is pivotable about the pivot axis C. Above the bevel gear 10, the gear cutting tool 202 (a cutterhead having rod cutters here) is mounted so it is rotatable on a tool spindle 200 or about a tool spindle axis A. The tool spindle 204 including the gear cutting tool 202 is seated here in a suspended constellation on a machine stand, the housing of which is provided with the reference sign 201. The machine stand is equipped with three linear axes X, Y, and Z, as shown in FIGS. 3 and 4. The bevel gear cutting machine 200 therefore has six numerically-controlled axes A, B, C, X, Y, and Z.

A carriage 30 having a deburring device 50 is provided on the machine stand and/or the housing 201. The carriage 30 enables a linear displacement of the deburring device 50 relative to the bevel gear 10. The corresponding linear axis is identified here as the X2 axis and extends in parallel to the X axis, for example.

The deburring device 50 may comprise a deburring spindle 51 having the above-mentioned deburring spindle axis Q, which has a horizontal orientation in the example shown here. A deburring tool 60 can be fastened on the deburring spindle 51, which is referred to as the first deburring tool 60.1, as shown in FIG. 3. The deburring tool 60 shown in FIG. 3 is specifically a deburring cutterhead 60.1, which is equipped with cutter inserts (for example, in the form of rod cutters), so that they protrude radially out of the circumference of the deburring tool 60.1. Details of a corresponding deburring tool 60.1 are shown on the left in FIG. 5.

However, two deburring tools 60.1 and 60.2 can also be fastened on the deburring spindle 51, as shown in FIG. 4.

The two axes X2 and Q, which are associated with the deburring device 50, may be CN-controlled auxiliary axes. The bevel gear cutting machine 200 therefore has a total of 8 numerically-controlled axes A, B, C, X, Y, Z, X2, and Q in the constellation shown in FIG. 3. In the constellation shown in FIG. 4, the machine 200 has a total of 9 numerically-controlled axes A, B, C, X, Y, Z, X2, Q2, and D, wherein the D axis is a pivot axis of the deburring device 50.

Numerically-controllable axes in this context are axes which are controllable via a programmable controller. The numerically-controllable axes are designed and arranged so that by adjusting at least one of the axes, the workpiece spindle 205 including the bevel gear 10 is movable relative to the deburring tool 60 so that cutting edges of the deburring tool 60, in the case of simultaneous coupled rotation of the workpiece spindle 205 about the workpiece spindle axis B and the deburring tool 60 about the deburring spindle axis Q (FIG. 3), plunge in succession into tooth intermediate spaces 14 of adjacent teeth 15.*r*, 15.*l* of the bevel gear 10 and execute a chamfering or deburring movement in relation to the predefined tooth edges 11.*r*, 11.*l* and chamfer edges 12.1 of the bevel gear 10.

As indicated in FIG. 3, the deburring spindle axis Q of the deburring tool 60 can extend in parallel to the Y axis, for example. However, other axis constellations are possible.

Overall, the bevel gear cutting machine 200 thus may have eight or nine numerically-controlled axes. However, bevel gear cutting machines 200 having another number of axes can also be used, wherein at least six numerically-controlled axes (for the continuously working deburring method using two passes) have to be provided.

According to certain embodiments, one or more of the numerically-controlled axes may be used to move the cutting edges of the deburring tool 60 relative to the workpiece 10. Before carrying out the second pass, the machine setting of the bevel gear cutting machine 200 may be changed so that the cutting edges of the deburring tool 60 are steeper relative to the affected edges of the workpiece 10 than in the scope of the first pass.

Figure 6A:
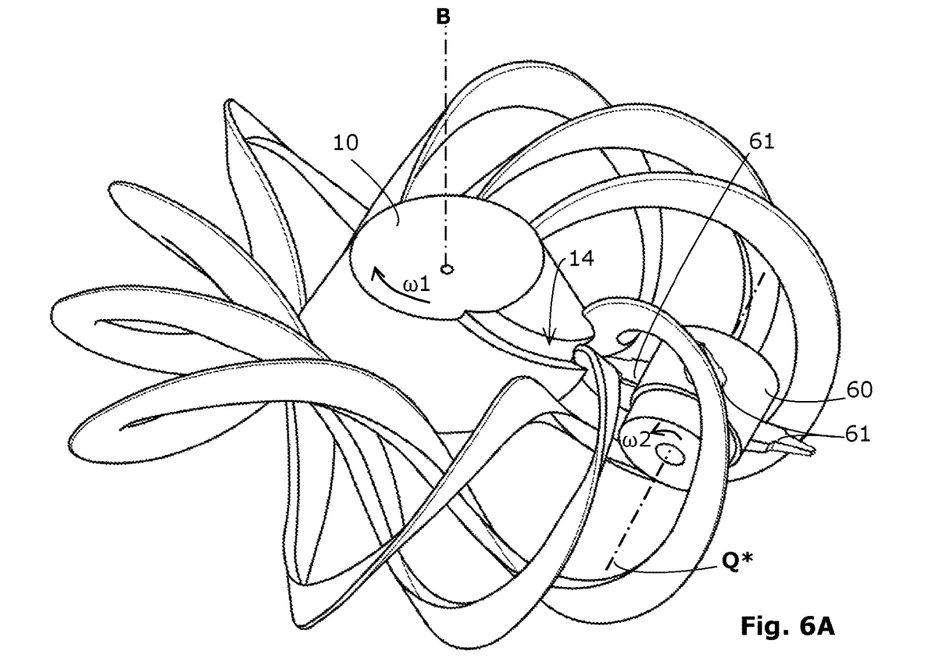
FIG. 6A shows a schematic three-dimensional view of a first pass during chamfering according to certain embodiments.
Figure 6B:
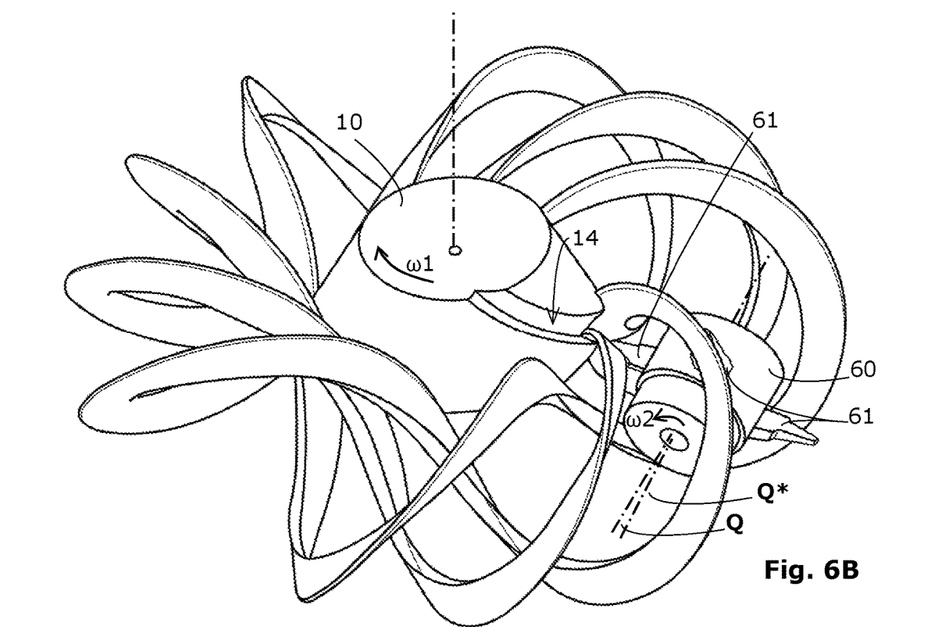
FIG. 6B shows a schematic three-dimensional view of a second pass during chamfering according to certain embodiments.

Details in this regard can be inferred from the schematic three-dimensional illustrations of FIGS. 6A and 6B. In FIG. 6A, the bevel gear workpiece 10 is shown having only one tooth gap 14. Since the bevel gear workpiece 10 rotates at the angular velocity ω1 about the workpiece axis B and the deburring tool 60 rotates at the angular velocity ω2 about the deburring spindle axis Q (identified here with Q*) and since the two rotational movements are coupled, helical trajectories result in three-dimensional space for the cutters 61 of the deburring tool 60. FIG. 6A only shows the trajectory of the cutter 61 which at the moment shown creates a first chamfer 12 on a concave flank of the tooth gap 14 (the chamfer 12 is not recognizable in FIG. 6A).

FIG. 6B shows a corresponding illustration of the second pass, wherein in the second pass, a second chamfer 13 is created on the first chamfer 12, as already described above (the chamfer 13 is not recognizable in FIG. 6B).

The illustrations of FIGS. 6A and 6B show the stationary bevel gear workpiece 10, i.e., the rotation of the bevel gear workpiece 10 was converted into a rotation of the deburring tool 60 about the bevel gear workpiece 10.

If one compares the trajectories of FIGS. 6A and 6B in three-dimensional space to one another, it can be seen that in FIG. 6B, the deburring tool 60 is guided somewhat more steeply along the edge to be deburred than in FIG. 6A. To be able to better illustrate the change of the machine setting between the first pass and the second pass, in FIG. 6B, both the location of the deburring spindle axis Q* of the first pass and also the location of the deburring spindle axis Q of the second pass are shown.

The illustrations of FIGS. 6A and 6B are solely of a schematic nature and have been simplified such that the modification of the machine setting can be made visible.

The machine 200 of FIG. 4 has a deburring device 50, which comprises two deburring spindles 51, 52 and two deburring tools 60.1 and 60.2. The two deburring spindles 51, 52 and the two deburring tools 60.1, 60.2 fastened thereon are arranged coaxially. The deburring tool 60.1 can be rotationally driven about the deburring spindle axis Q1 and the deburring tool 60.2 can be rotationally driven about the deburring spindle axis Q2. In the pivoted position of the deburring device 50 shown in FIG. 4, the deburring tool 60.1 can be brought into contact with the bevel gear 10 to carry out the first deburring or chamfering procedure. To be able to bring the second deburring tool 60.2 into contact with the bevel gear 10, the deburring device 50 is pivoted about the vertical axis D.

Figure 5:
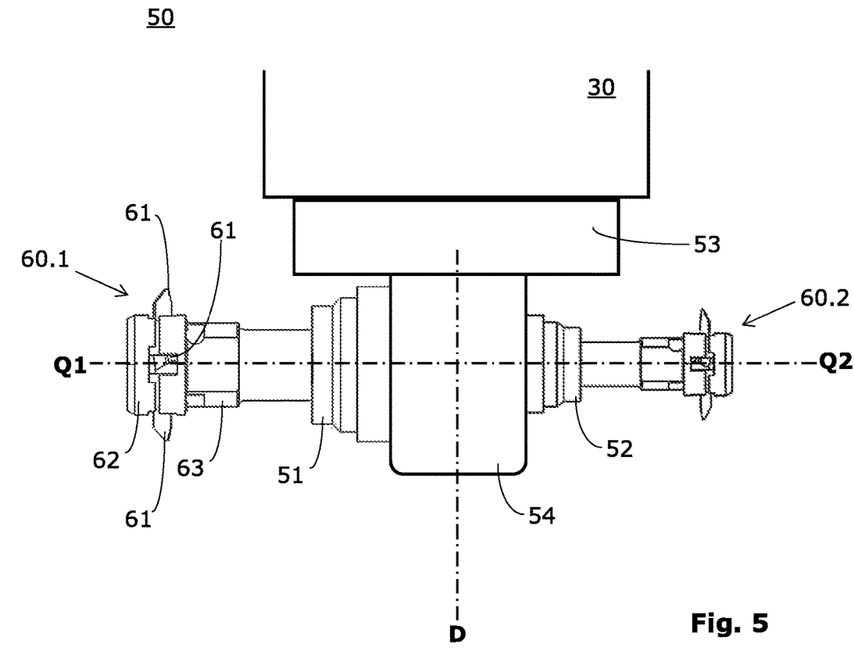
FIG. 5 shows a schematic view of a deburring device, which can be used in machining methods.

The bevel gear cutting machine 200 of FIG. 4 can be equipped, for example, with a deburring device 50, as is shown in detail by way of example in FIG. 5. A lower region of the carriage 30 can be recognized in FIG. 5. A pivot device 53 and a drive unit 54, which can be pivoted relative to the pivot device 53 about the vertical axis D, are seated here below the carriage 30. In the first position shown in FIG. 5, the first deburring tool 60.1 including the first deburring spindle 51 points to the left and the second deburring tool 60.2 including the second deburring spindle 52 points to the right. It can be seen well in FIG. 5 that the two deburring spindles 51, 52 and the two deburring tools 60.1, 60.2 fastened thereon are arranged coaxially. The deburring spindle axes Q1 and Q2 form a common axis. The rotational movement of the first deburring tool 60.1 including the first deburring spindle and the second deburring tool 60.2 including the second deburring spindle 52 can be coupled to one another (for example, by providing only one rotational drive in the drive unit 54). The drive unit 54 can also comprise two separate rotational drives, however.

Each deburring cutterhead 60, 60.1, 60.2 can be constructed according to the following principle, wherein the following specifications are only to be understood as an example. This principle will be explained on the basis of the deburring cutterhead 60.1 shown on the left in FIG. 5.

The example of a suitable deburring milling cutter can be inferred from granted European Patent EP1598137 B1, which is hereby incorporated by reference in its entirety.

The deburring cutterhead 60.1 can be screwed onto the deburring spindle 51 via a plate 62 and screws (not shown). A main holder 63 is provided, which has various elements for accommodating cutter inserts 61 (for example, in the form of rod-shaped deburring cutters). Three cutter inserts 61 are visible in FIG. 5. The deburring cutterhead 60.1 can have multiple cutter inserts 61, which are insertable into recesses of the deburring cutterhead 60.1, wherein the cutter inserts 61 are oriented substantially radially in relation to the deburring spindle axis Q, Q1, Q2. Each of the cutter inserts 61 has at least one cutting edge or chamfering and/or deburring the workpiece 10. Instead of the recesses on the deburring cutterhead 60.1, other fastening means can also be provided for clamping or fastening the cutter inserts 61.

The deburring cutterhead 60.2 can be constructed in at least some embodiments similarly or precisely like the deburring cutterhead 60.1. It can be seen in FIG. 5 that the second deburring cutterhead 60.2 may be smaller than the first deburring cutterhead 60.1. This is because, on the one hand, the cutting edges of the cutter inserts 61 of the second deburring cutterhead 60.2 only have to cut shorter second chamfers 13 than the cutting edges of the cutter inserts 61 of the first deburring cutterhead 60.1. In addition, the second deburring cutterhead 60.2 may be set steeper, to be able to cut the second chamfers 13. To avoid a collision with the workpiece 10, the second deburring cutterhead 60.2 should project further less than the first deburring cutterhead 60.1.

According to certain embodiments, cutter inserts 61 made of either hard metal, tool steel, or cutting ceramic can be used. This is a substantial difference from conventional deburring milling cutters. In at least one embodiment, micro-grain hard metal is used, because then the cutting edges of the cutter inserts 61 remain sharp for a long time and cut cleanly.

No noteworthy time losses arise for the deburring on the gear cutting machine in two passes, since due to the use of special cutter inserts 61, it is possible to operate in the continuous method at relatively high cutting speeds.

As may be recognized by those of ordinary skill in the pertinent art based on the teachings herein, numerous changes and modifications may be made to the above described and other embodiments of the present invention without departing from the spirit of the invention as defined in the claims. Accordingly, this detailed description of embodiments is to be taken in an illustrative, as opposed to a limiting sense.

What is claimed is:

1. A bevel gear cutting machine comprising:
a plurality of numerically-controllable axes;
a workpiece spindle;
a workpiece spindle axis, wherein the workpiece spindle is configured to receive a bevel gear coaxially with the workpiece spindle axis; and
a deburring device including a deburring spindle configured to receive at least one first deburring tool defining at least one cutting edge;
wherein the bevel gear cutting machine is configured to chamfer tooth edges in a first pass and a second pass;
wherein, in the first pass, first chamfers are formed in the tooth edges by using the at least one cutting edge of the at least one first deburring tool in a continuous process in which the bevel gear and the at least one first deburring tool coupledly rotate while engaged with one another; and
wherein, in the second pass, second chamfers are formed adjacent or near the first chamfers by using the at least one cutting edge of the at least one first deburring tool or by using at least one cutting edge of a second deburring tool in a continuous process, in which the bevel gear and the at least one first or second deburring tool coupledly rotate while engaged with one another.

2. The bevel gear cutting machine according to claim 1, wherein, in the first pass, the at least one first deburring tool is set at a first angle relative to the bevel gear and, in the second pass, said at least one first deburring tool or second deburring tool is set more steeply relative to the bevel gear than the at least one first deburring tool in the first pass.

3. The bevel gear cutting machine according to claim 1, wherein one or more of the at least one first deburring tool or the second deburring tool is a deburring cutterhead.

4. The bevel gear cutting machine according to claim 3, wherein the deburring cutterhead comprises cutter inserts include one or more of hard metal, tool steel, or cutting ceramic.

5. The bevel gear cutting machine according to claim 1, wherein the deburring device includes both the at least one first deburring tool and the second deburring tool.

6. The bevel gear cutting machine according to claim 5, further defining a pivot axis, wherein the at least one first deburring tool is located coaxially with the second deburring tool and the deburring device is pivotable about the pivot axis of the bevel gear cutting machine.

7. The bevel gear cutting machine according to claim 6, wherein the pivot axis defines a vertical axis.

8. The bevel gear cutting machine according to claim 1, further defining at least six axes and including a deburring spindle axis defining a rotational axis of the deburring spindle.

9. The bevel gear cutting machine according to claim 8, further defining a linear axis for linear movement of one or more of the at least one first deburring tool or the second deburring tool.

10. A method for chamfering tooth edges of a bevel gear in a numerically-controllable bevel gear cutting machine comprising:
performing a first pass and using a deburring tool in the first pass to create first chamfers at or near tooth edges of a bevel gear, and
performing a second pass and using a deburring tool in the second pass to create second chamfers at or near the first chamfers,
and further including performing the first pass and the second pass so that the first chamfers together with the second chamfers define double facets that extend substantially in parallel to one another.

11. The method according to claim 10, including performing both the first pass and the second pass as continuous machining processes including coupledly rotating the bevel gear and the deburring tool while engaged with one another.

12. The method according to claim 10, further including setting the deburring tool less steeply in relation to the bevel gear for the first pass than for the second pass.

13. The method according to claim 10, wherein the deburring tool defines a deburring cutterhead including a plurality of rod-type cutter inserts.

14. The method according to claim 10, further including, while performing the first pass, guiding cutting edges of the deburring tool from a head of the bevel gear to a base of the bevel gear outward through tooth gaps of the bevel gear, thereby creating the first chamfers.

15. The method according to claim 14, further including, while performing the second pass, guiding cutting edges of the deburring tool from the head of the bevel gear to the base of the bevel gear outward through tooth gaps of the bevel gear, thereby creating the second chamfers.

16. The method according to claim 10, further including performing the second pass using a different deburring tool than in the first pass.

17. The method according to claim 10, wherein the bevel gear cutting machine includes a deburring device including a first deburring tool and a second deburring tool and the method includes performing the first pass using the first deburring tool, performing the second pass includes using the second deburring tool, and rotating or pivoting the deburring device before the performing the second pass so as to use the second deburring tool in the second pass.

* * * * *